United States Patent [19]
Johnson

[11] Patent Number: 5,215,229
[45] Date of Patent: Jun. 1, 1993

[54] TOOTHPASTE DISPENSER WITH A FLEXIBLE AIR COMPRESSING BAG USED TO BRING ABOUT DISPENSING

[76] Inventor: Robin L. Johnson, 1271 Redbush Rd., Akron, Ohio 44320

[21] Appl. No.: 818,860

[22] Filed: Jan. 10, 1992

Related U.S. Application Data

[63] Continuation-in-part of Ser. No. 538,530, Jun. 15, 1990, Pat. No. 5,115,948.

[51] Int. Cl.⁵ .............................................. G01F 13/00
[52] U.S. Cl. ...................................... 222/209; 222/389
[58] Field of Search ...................... 222/94, 209, 386.5, 222/389, 401

[56] References Cited

U.S. PATENT DOCUMENTS

| | | | |
|---|---|---|---|
| 3,184,120 | 5/1965 | Undi | 222/209 |
| 3,494,513 | 2/1970 | Bauer | 222/386.5 |
| 4,386,717 | 6/1983 | Koob | 222/94 |

FOREIGN PATENT DOCUMENTS

| | | | |
|---|---|---|---|
| 2914272 | 10/1980 | Fed. Rep. of Germany | 222/389 |
| 3515101 | 10/1986 | Fed. Rep. of Germany | 222/389 |
| 3530212 | 10/1986 | Fed. Rep. of Germany | 222/389 |
| 3708396 | 10/1987 | Fed. Rep. of Germany | 222/389 |

Primary Examiner—Andres Kashnikow
Assistant Examiner—A. Pomrening
Attorney, Agent, or Firm—William J. Ruano

[57] ABSTRACT

A toothpaste dispenser comprising a cylindrical tube of rigid material, partially surrounded by a flexible air compressing bag of rubber or other flexible material which has an air-tight fit with the tube whereby squeezing of the bag will create pressure in the bag and cylindrical tube and dispense toothpaste through an opening at the top of the tube. An air-tight, detachable bottom is provided for the tube and bag, which bottom has a one-way valve providing connection between the tube and bag. Various modifications are shown for the one-way valve.

4 Claims, 8 Drawing Sheets

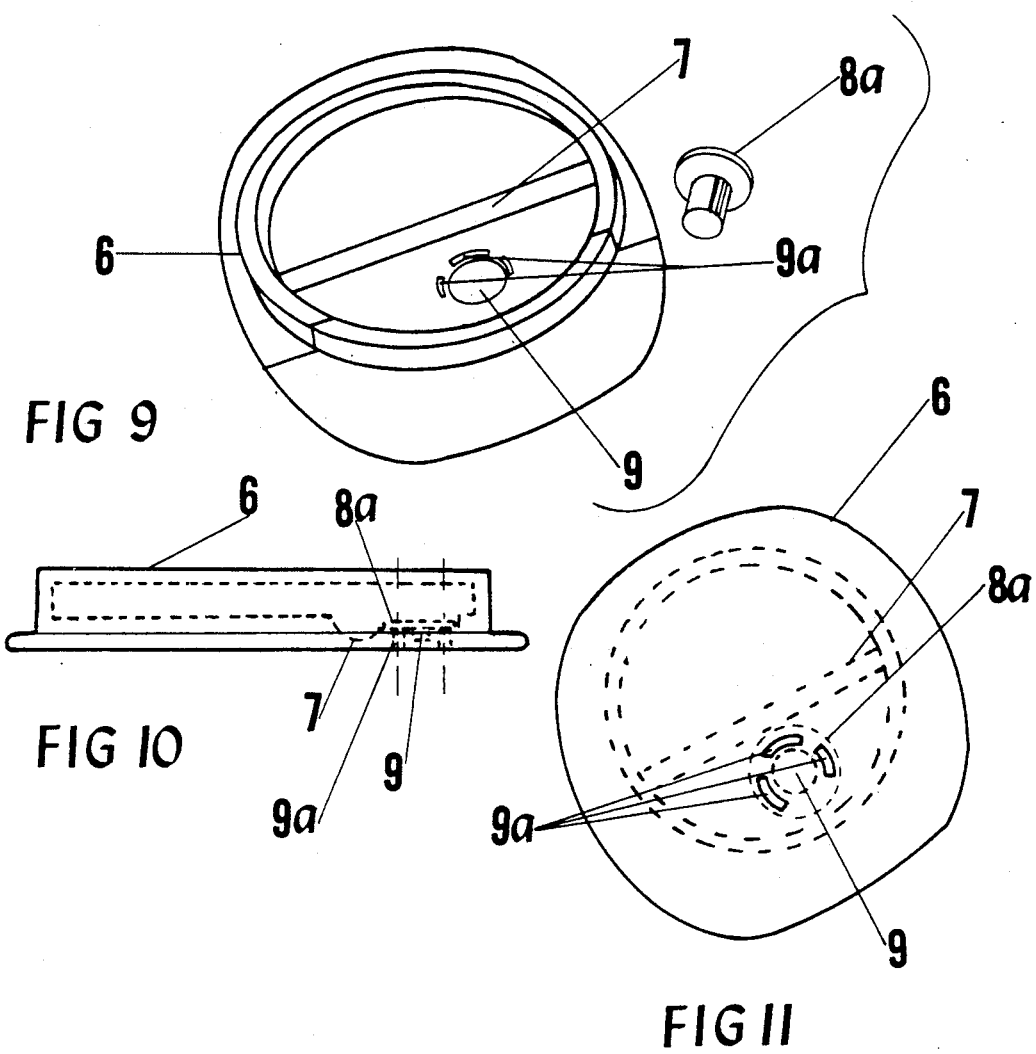
FIG 9
FIG 10
FIG 11
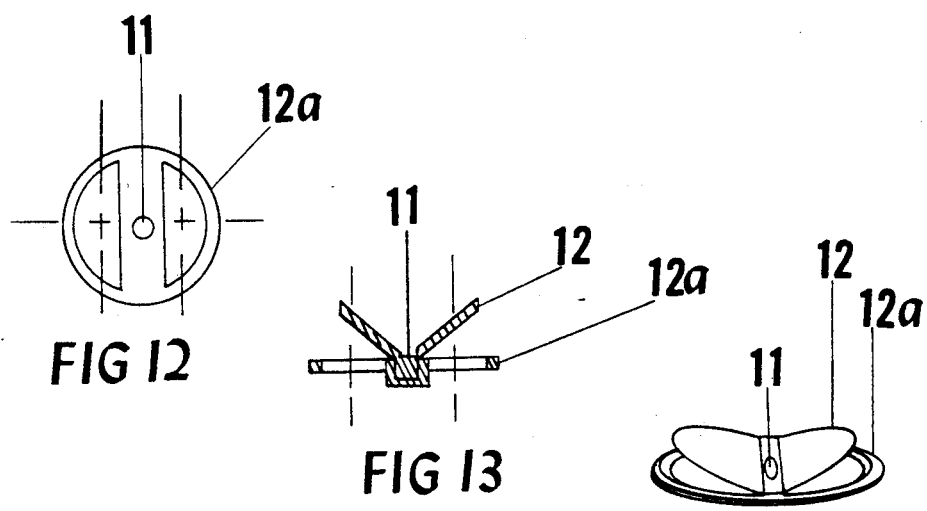
FIG 12
FIG 13
FIG 14

TOOTHPASTE DISPENSER WITH A FLEXIBLE AIR COMPRESSING BAG USED TO BRING ABOUT DISPENSING

This is a complete continuation-in-part of Ser. No. 07/538,530 filed Jun. 15, 1990 now U.S. Pat. No. 5,115,948 dated May 26, 1992.

BACKGROUND OF THE INVENTION

My above-identified earlier filed application has the disadvantage of more parts which increase the cost of manufacture.

An object of the present invention is to overcome the above mentioned disadvantage by providing a novel arrangement involving fewer inexpensive parts and which perform in an improved manner to dispense toothpaste.

BRIEF DESCRIPTION OF THE DRAWING

FIG. 9 is an exploded view of a third modification of the valve;

FIG. 10 is a side view thereof;

FIG. 11 is a bottom view thereof;

FIG. 12 is a top view of a flap type gull wing designed check valve;

FIG. 13 is a sectional view thereof; and

FIG. 14 is a top perspective view of a flap type gull wing designed check valve.

DETAILED DESCRIPTION

Figure 1:
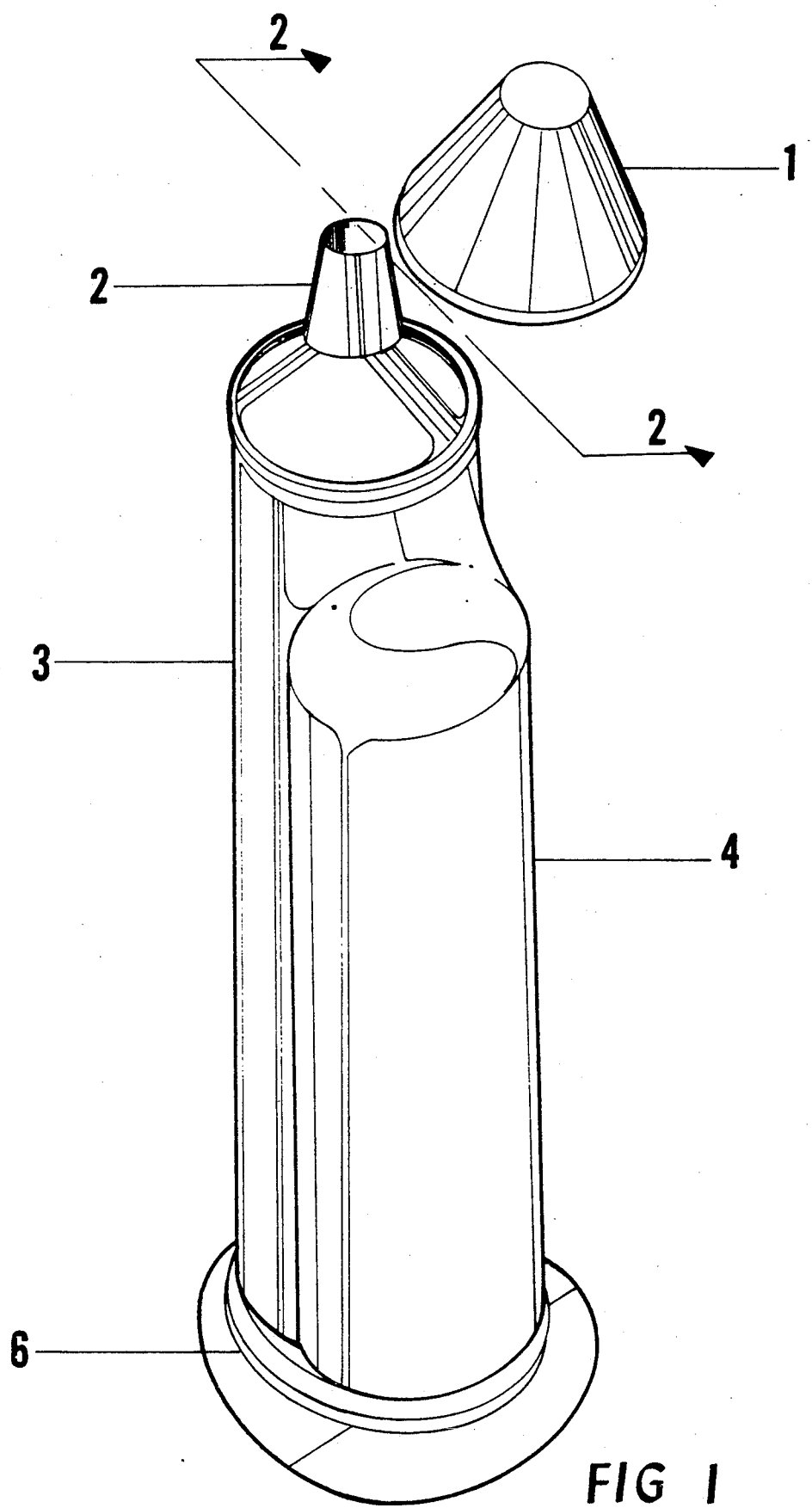
FIG. 1 is perspective view of a toothpaste dispensing container embodying the present invention.
Figure 2:
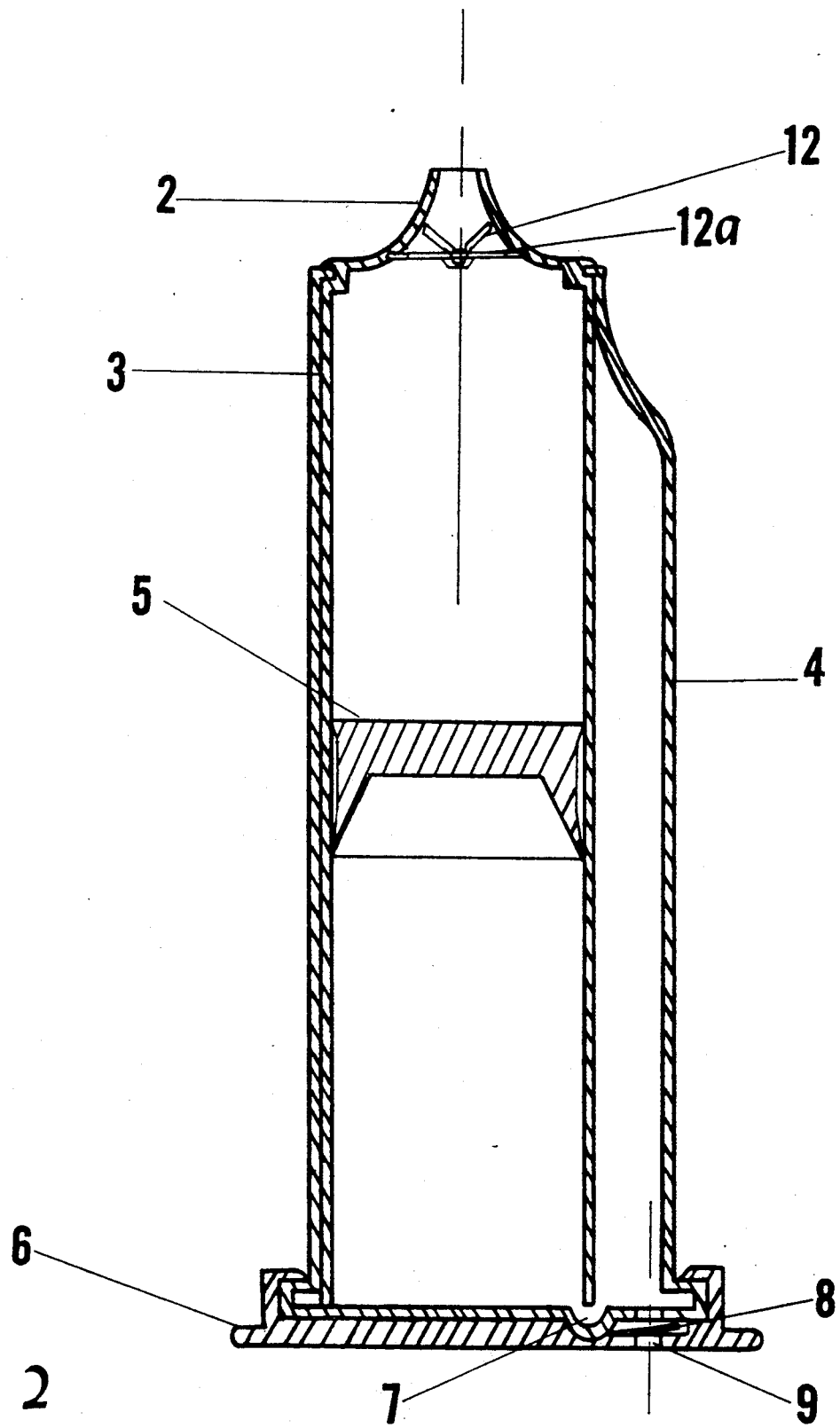
FIG. 2 is a vertical cross-sectional view thereof, when assembled, taken along line 2—2 of FIG. 1.

Referring to FIGS. 1 and 2, numeral 1 denotes a detachable closure cap which fits over a dispensing nozzle 2 on top of cylindrical tube 3. A flexible air compressing bag 4 is disposed alongside a cylindrical tube 3 forming a dual cavity dispenser. One cavity is in the air compressing bag 4, made of flexible plastic, somewhat of a synthetic, which may be rubber aesthetically contoured as an integral part of a dispenser having also a cylindrical tube containing a viscous product or toothpaste within its cavity. The air bag 4 is longitudinally attached to tube 3 in an air-tight manner and appears as one whole part of a dispensing package, making the cylindrical tube 3 appearance less obvious as it is hidden within the flexible air bag 4.

The cylindrical tube 3 can be designed so that it may be dislodged and reloaded back into its rightful position inside air bag 4 or dispensing package.

The plastic dispenser can be constructed of hard and soft plastic achieved by variations of wall thickness. A thinner wall thickness is sought in order to obtain a desired flexible air compressing bag that will return to its undeformed condition after squeezing.

FIG. 2. is a sectional view taken along line 2—2 of FIG. 1 and shows a plastic dispenser equipped with a shut off or check valve 12 and washer 12a located in the base of nozzle 2. The valve simulates gull wings. A flap type valve opens offering dual exits whereby toothpaste is forwarded through washer 12a into dispensing nozzle 2. Also located at the bottom of dispenser will be a closure member 6, sealingly secured to the base. The outer wall of dispenser flexible air bag 4 may have any cross section that accommodates the hand of the user. It has been found that an oval design (FIG. 3a) is particularly well suited and will maintain an undeformed condition, generally at the base where it is important that the closure member 6 not be dislodged during air bag squeezing.

The piston 5, shown in FIG. 2, of disc shape, is actuated by compressed air or a vacuum introduced at the bottom of cylindrical tube 3 by way of the flexible plastic air compressing bag 4.

Figure 3:
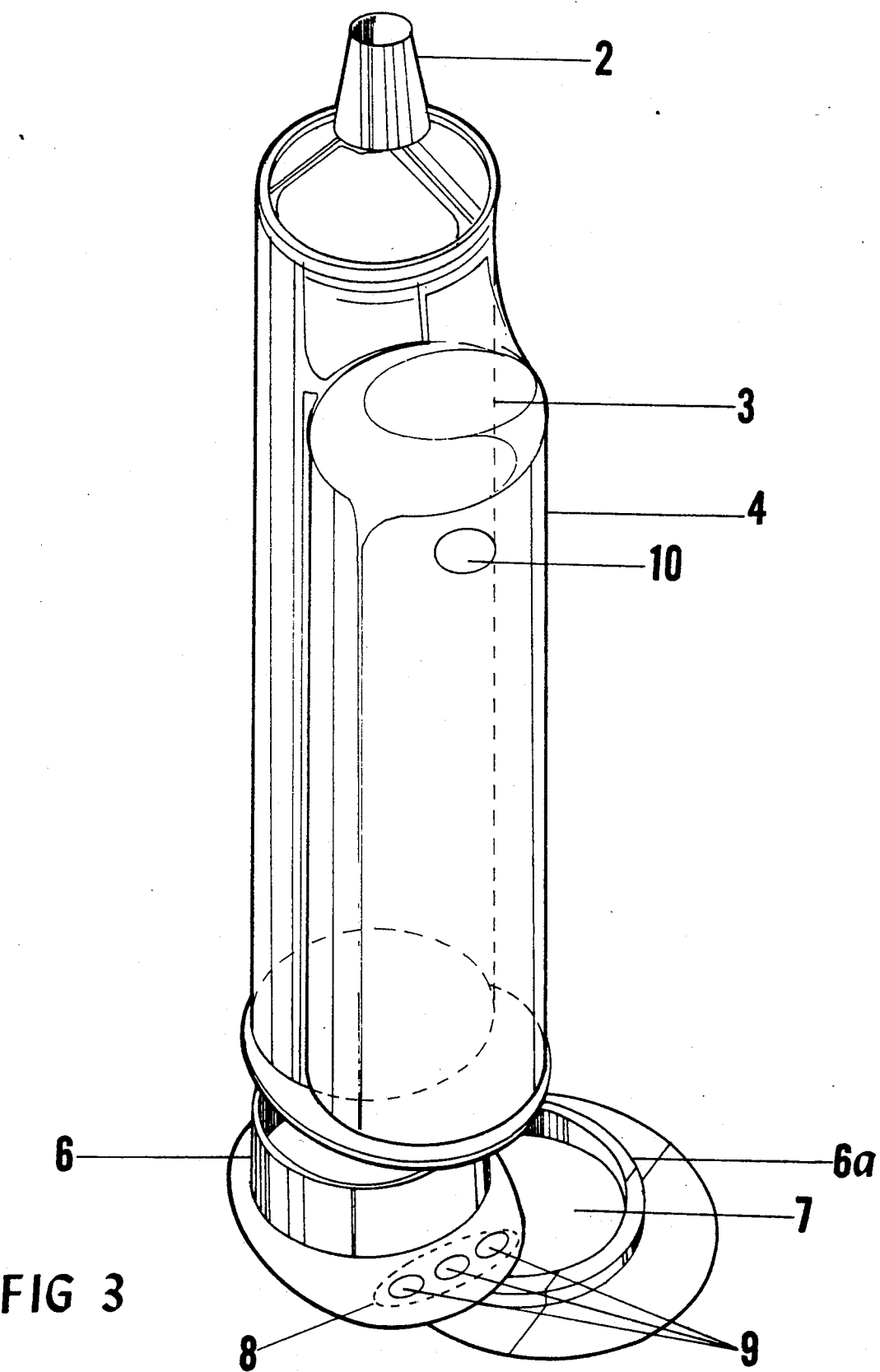
FIG. 3 is a perspective view of a modification showing a cylindrical tube hidden inside the flexible air bag perimeter.
Figure 3A:
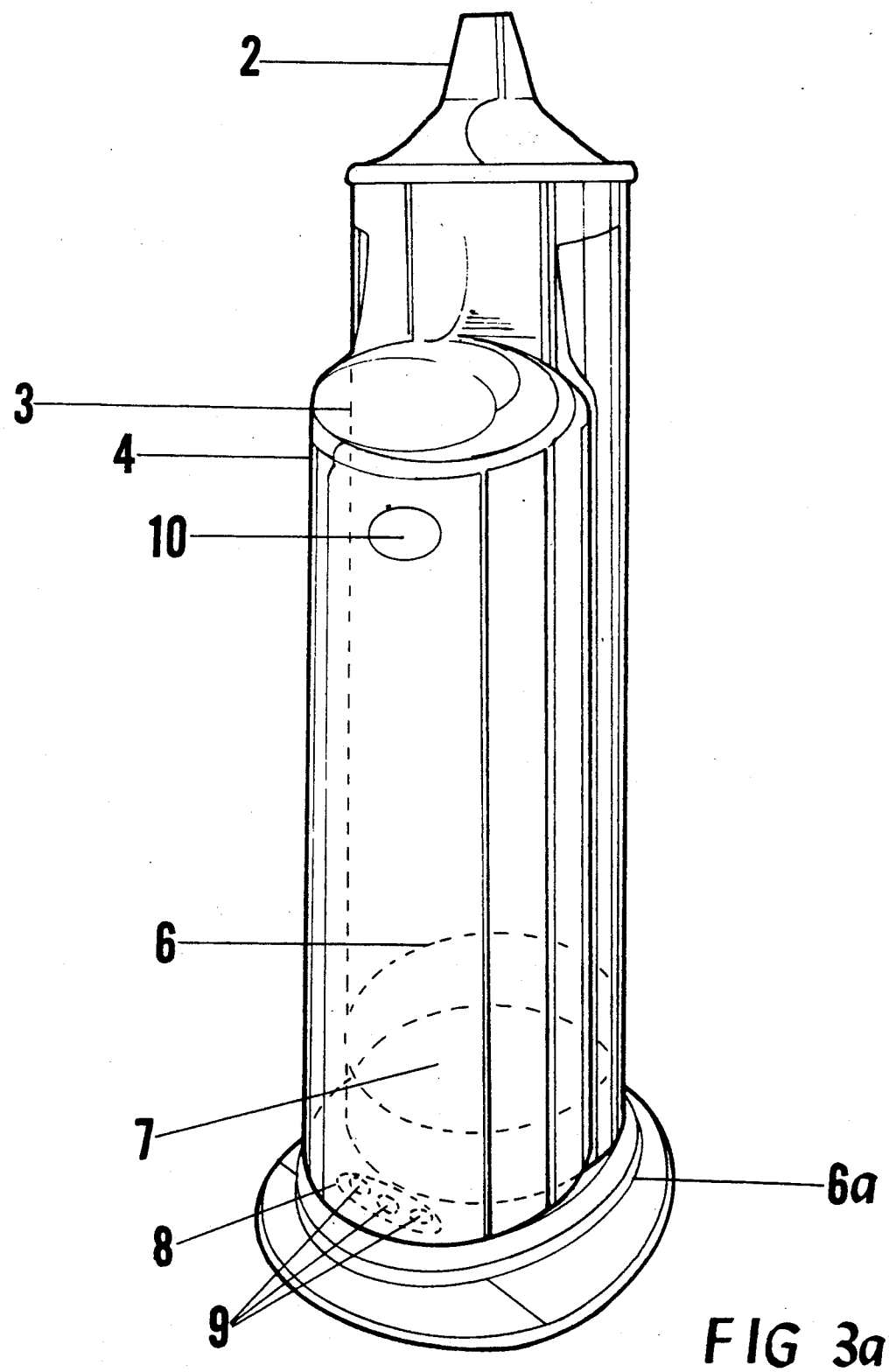
FIG. 3a is a top perspective view of a flexible air compressing bag design modification.
Figure 4:
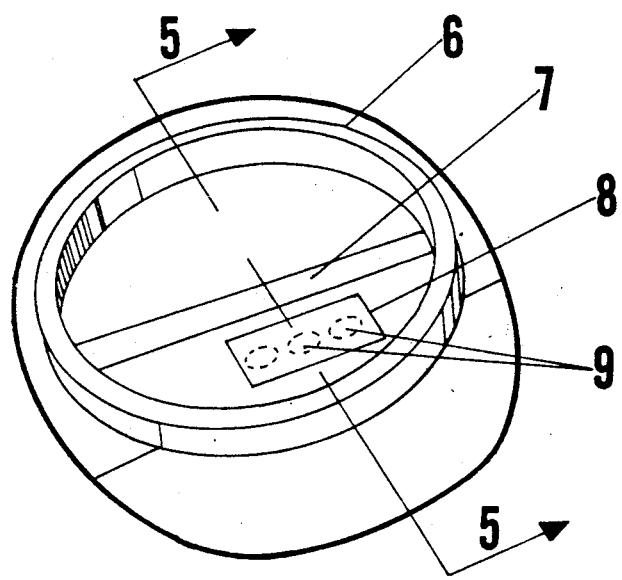
FIG. 4 is a top perspective view of the valve shown at the bottom of FIG. 2.
Figure 5:
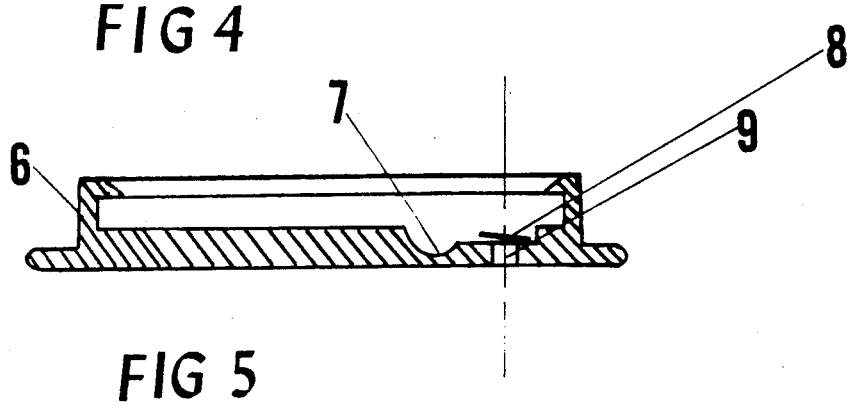
FIG. 5 is a cross-sectional view taken along line 5—5 of FIG. 4.
Figure 6:
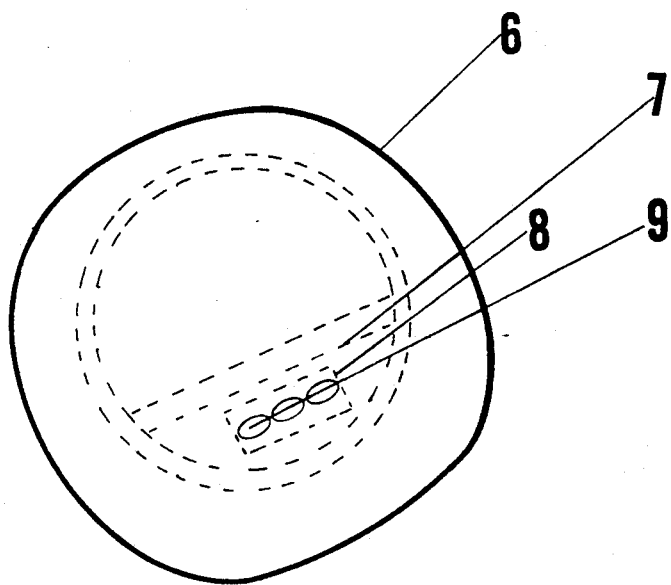
FIG. 6 is a bottom view of the valve of FIG. 5.

FIG. 4, a top view, FIG. 5, a side section view taken along line 5—5 of FIG. 4, and FIG. 6, a bottom view, identify a one-way valve positioned permanently on the bottom of the dispenser in the form of Mylar or an adhesive tape 8 covering air entry holes 9 through closure member 6. This valve will be described as an air intake valve caused by a vacuum after squeezing flexible air bag 4. The holes 9 draw a vacuum through closure member 6 securely positioned in the base of the dispenser. The tape 8 is securely attached to the upper surface of closure member 6 covering holes 9 through closure member 6. FIG. 1 denotes a dispenser air bag 4 design variation that excludes a hole 10 shown in FIG. 3 and FIG. 3a whereby a user hand or finger will block the hole in order to throttle air through as the dispenser is squeezed. A further description of this operation will be discussed after the following.

Now referring only to FIG. 1 air bag 4 designed in relation to the following and previously discussed valve configuration. Upon squeezing said air bag 4, compressed air is forwarded or conveyed through an indentation or air trough 7, compressed air then enters at the bottom of cylindrical tube 3. Also during squeezing air bag 4, the tape or Mylar 8 stops compressed air from escaping through holes 9 of closure member 6. The piston 5 is now tightly fitted against the inside wall of cylindrical tube 3. The air pressure caused by squeezing air bag 4 actuates piston 5 so that it will forward toothpaste to exit dispensing nozzle 2.

After squeezing air bag 4, it will return to its undeformed condition.

A second modification is shown in FIG. 9, a top view, FIG. 10, a side view not in section, and FIG. 11, a bottom view. A hole 9, not drilled completely through closure member 6, will be surrounded by three holes 9a that are drilled completely through closure member 6. Referring to the central hole 9, the rubber structure 8a has a stem which fits securely into the central hole 9. The structure 8a resembles the shape of a rivet. The structure 8a resembles the head of a nail. The head of the structure characterized now as a valve 8a has been flattened completely, remaining circular and flexible. Once the stem of valve 8a is inserted into central hole 9, the flexible circular head thereof completely covers the surrounding holes 9a of central hole 9. This valve 8a is positioned on the upper surface of closure member 6.

Figure 7:
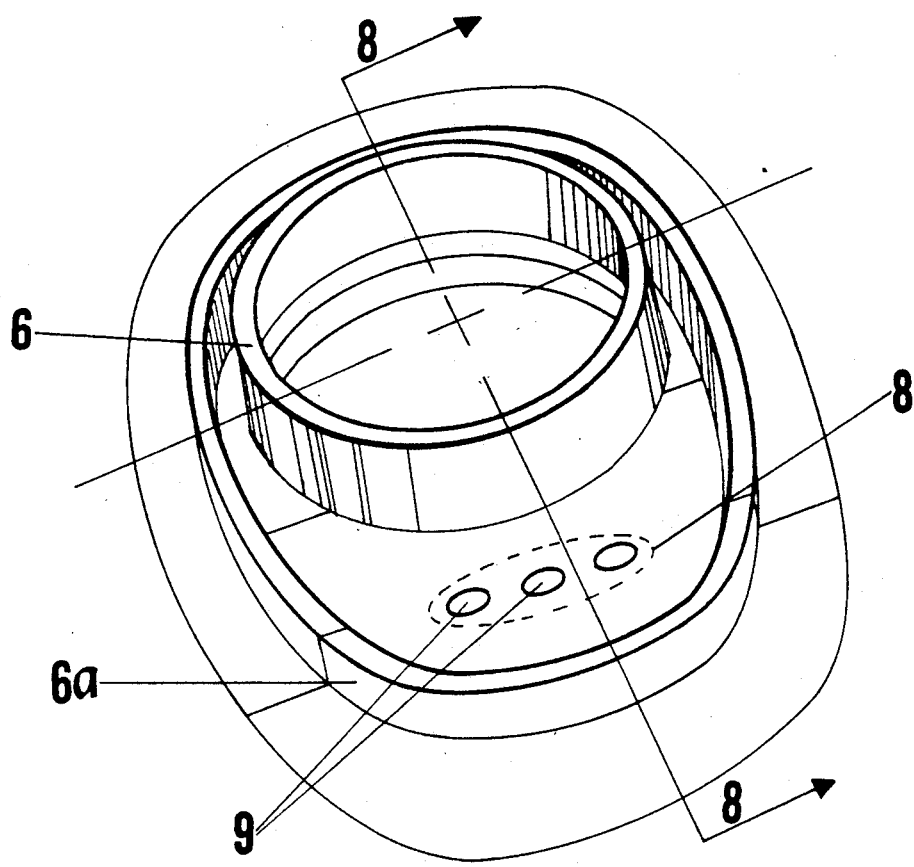
FIG. 7 is a top view of a second modification of the valve.
Figure 8:
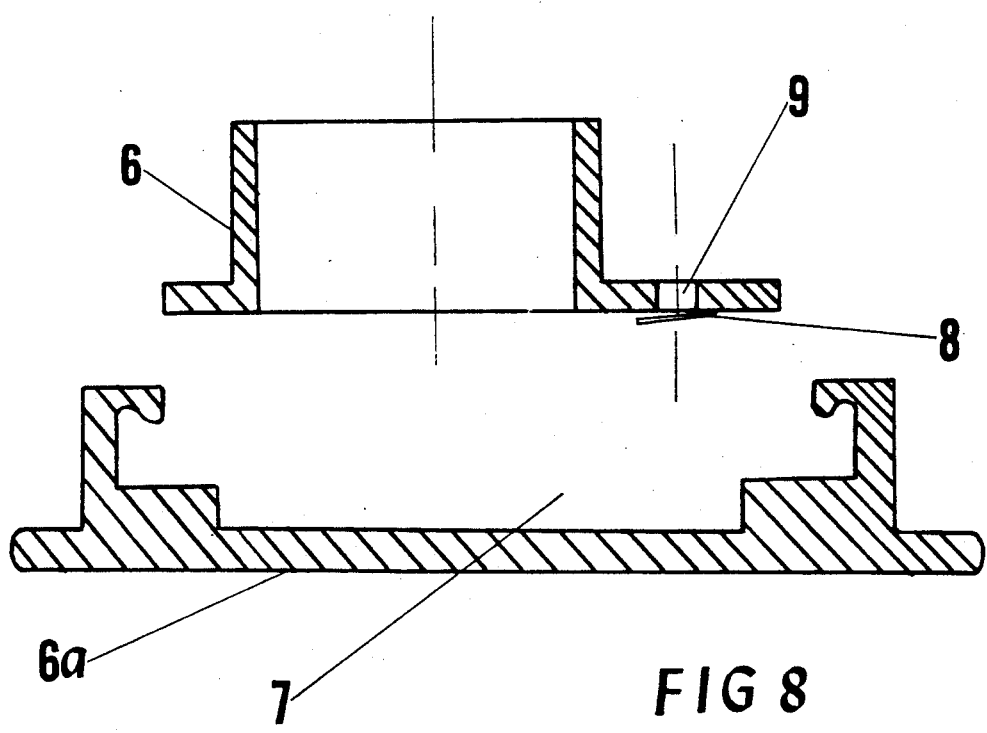
FIG. 8 is a sectional view taken along line 8—8 of FIG. 7.
Figure 8A:
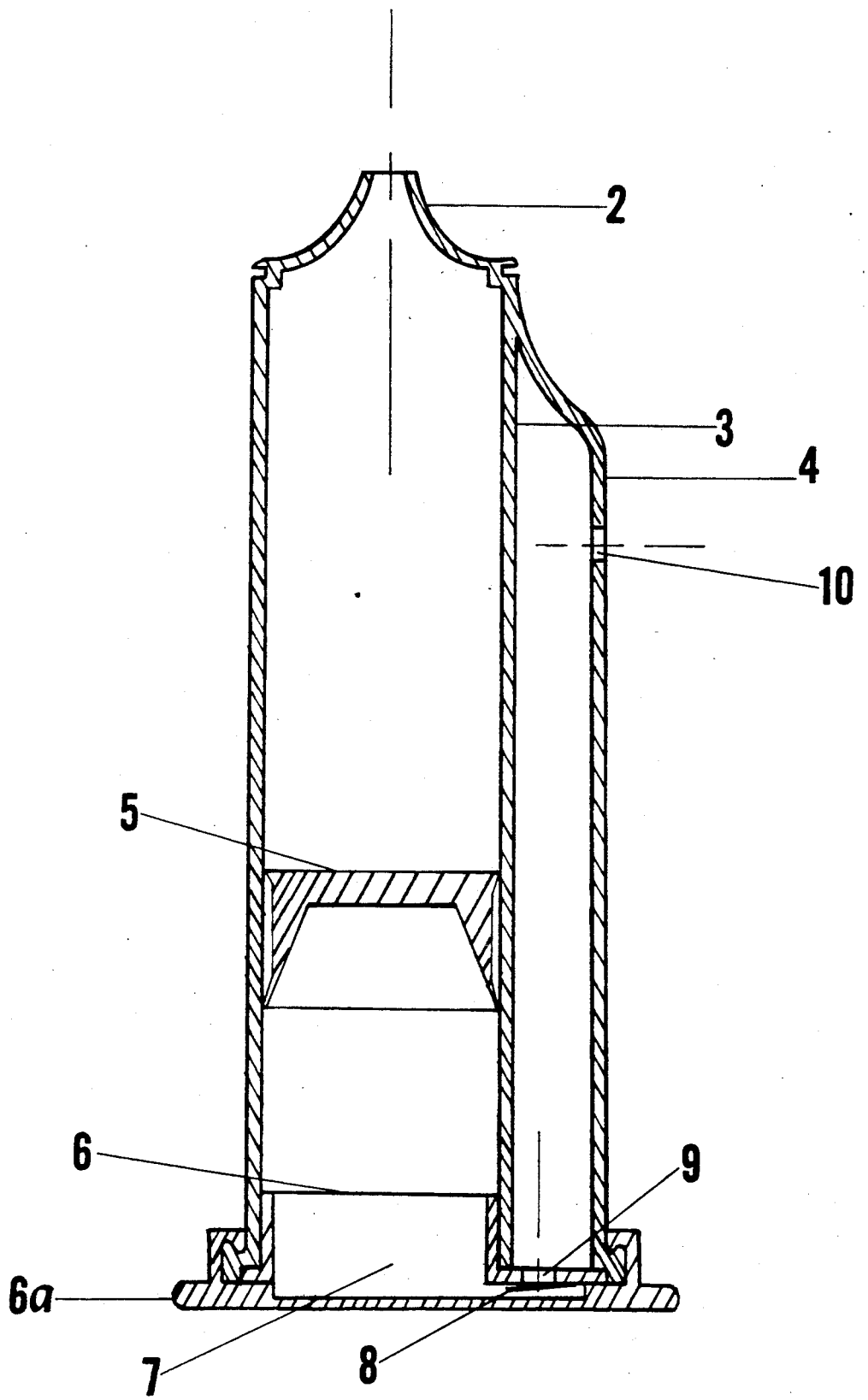
FIG. 8a is a sectional view taken along line 2—2 of FIG. 1 including the one-way valve shown in FIG. 8.

While squeezing air bag 4, compressed air will not escape past valve 8a through holes 9a through closure member 6, and will be compressed through an indentation or trough 7 into the bottom of cylindrical tube 3. After squeezing air bag 4, a vacuum is drawn through the holes 9a through closure member 6 raising the flexible head of valve 8a positioned on the upper surface of closure member 6. Air bag 4 returns to undeformed condition. FIGS. 3 and 3a show slight modifications of the container's flexible bag 4 which requires a closure member 6 modification and valve 8 reconfiguration. FIG. 7 and FIG. 8 show this valve 8 reconfiguration and closure member 6 modification, which may prove to be an ideal combination that will be characterized by covering hole 10, through air bag 4, shown in FIGS. 3 and 3a. Compressed air may be throttled through hole 10 of air bag 4 during squeezing.

FIG. 7 and FIG. 8 show a two piece closure member. The top piece resembles the constructive shape of a head visor having holes clearly through its visor portion. The actual size of this structure is securely fitted into the bottom base portion of the dispenser. There may be many variations to this design which will be noted by those skilled in the art, but this description will identify only one of those design variations to be discovered without straying from the overall scope and functional nature of a one-way air compressing valve, closure member 6.

It is observed FIG. 3 and FIG. 3a show this closure member 6 having two halves, the top half having holes 9 drilled completely through. The tape 8 is now placed on the lower surface covering the holes 9 drilled completely through the top half of closure member 6. The bottom half of closure member 6a actually forms the air tight seal at the base or bottom of the dispenser, being that there are no visible holes through 6a. The two halves may vary in shape but must always be matched to form an air gap or air space between them.

The ring or gasket portion of the upper piece is tightly fitted into the bottom of cylindrical tube 3 so that, after squeezing bag 4, air is compressed through the holes 9 of top half of closure member 6 and then seeps through slightly detached areas of tape 8, which cover holes 9 on the bottom surface of top half of closure member 6. The air is now trapped between the two halves of closure member 6 and 6a and passes through the air gap or air space and escapes upward through the ring or gasket portion of the top half of closure member 6.

The air enters at the bottom of cylindrical tube 3 where piston 5 begins upward movement to dispense toothpaste through dispensing nozzle.

A foreign matter shut off valve or check valve 12 and 12a can be added to the dispensing nozzle as an option. FIG. 12 shows a top view of washer 12a. FIG. 13 shows a side sectional view of 12 and 12a. FIG. 14 shows a top perspective view of gull wings 12 and washer 12a which presents dual exits. The stem of the gull wing flap valve 12 snaps into a central hole 11 drilled through the washer circumference divider. The washer 12a diameter is divided into two sides whereby toothpaste may exit therethrough. The gull wings 12 flap open to allow toothpaste to pass and dispense through the toothpaste nozzle 2. The gull wings 12 shown in FIG. 14 are in a somewhat closed position. The flaps 12 block washer 12a dual exits. Although various one-way valve structures have been mentioned, the dispenser can be operated without any valve structure designed as part of the closure member structure. The flexible air bag 4 can be manipulated by placing user's index finger over air throttle hole 10 and squeezing air bag 4. Compressed air is forced from flexible air bag 4 and enters the bottom of cylindrical tube 3. The closure member 6 provides an air-tight seal, at bottom or base of dispenser, and will prevent compressed air from escaping while squeezing flexible air bag 4. Therefore compressed air will thrust piston 5 upward in increments, to dispense toothpaste through nozzle 2.

I claim:

1. A toothpaste dispenser comprising a toothpaste containing cylindrical tube of rigid material having a dispensing nozzle at the top thereof, a flexible air compressing bag partially surrounding and forming an airtight fit with said tube along the sides and top of said tube, a piston forming an air-tight fit initially with the bottom of said tube and, during dispensing, along the inside surface of said tube, a detachable bottom forming an air-tight fit with the bottom of said tube and said bag, and a one-way valve in said detachable bottom providing air intercommunication between said bag and said tube, whereby intermittent compression of said bag will forward said piston upwardly to cause dispensing of toothpaste through said nozzle.

2. A toothpaste dispenser as recited in claim 1 wherein said flexible air compressing bag further includes an air bag throttle hole.

3. A toothpaste dispenser as recited in claim 1 wherein an air trough in said detachable bottom enables air intercommunication between the bottom of said tube and said bag.

4. A toothpaste dispenser as recited in claim 1 wherein said one-way valve comprises a flexible strip of material covering a plurality of holes on a upper surface of said detachable bottom to permit the air in the flexible air compressing bag to be compressed into the bottom of said cylindrical tube.

* * * * *